W. EMERY.
BALE TIE MACHINE.
APPLICATION FILED MAR. 4, 1912.

1,125,991.

Patented Jan. 26, 1915.
5 SHEETS—SHEET 1.

WITNESSES.
J. R. Keller
G. C. Raymond

INVENTOR.
Wilber Emery
By Kay Totten
atty.

W. EMERY.
BALE TIE MACHINE.
APPLICATION FILED MAR. 4, 1912.

1,125,991.

Patented Jan. 26, 1915.

5 SHEETS—SHEET 2.

WITNESSES.
J. R. Keller
G. C. Raymond

INVENTOR.
Wilber Emery
By Kay & Totten
attys

W. EMERY.
BALE TIE MACHINE.
APPLICATION FILED MAR. 4, 1912.

1,125,991.

Patented Jan. 26, 1915.
5 SHEETS—SHEET 3.

WITNESSES.

INVENTOR.

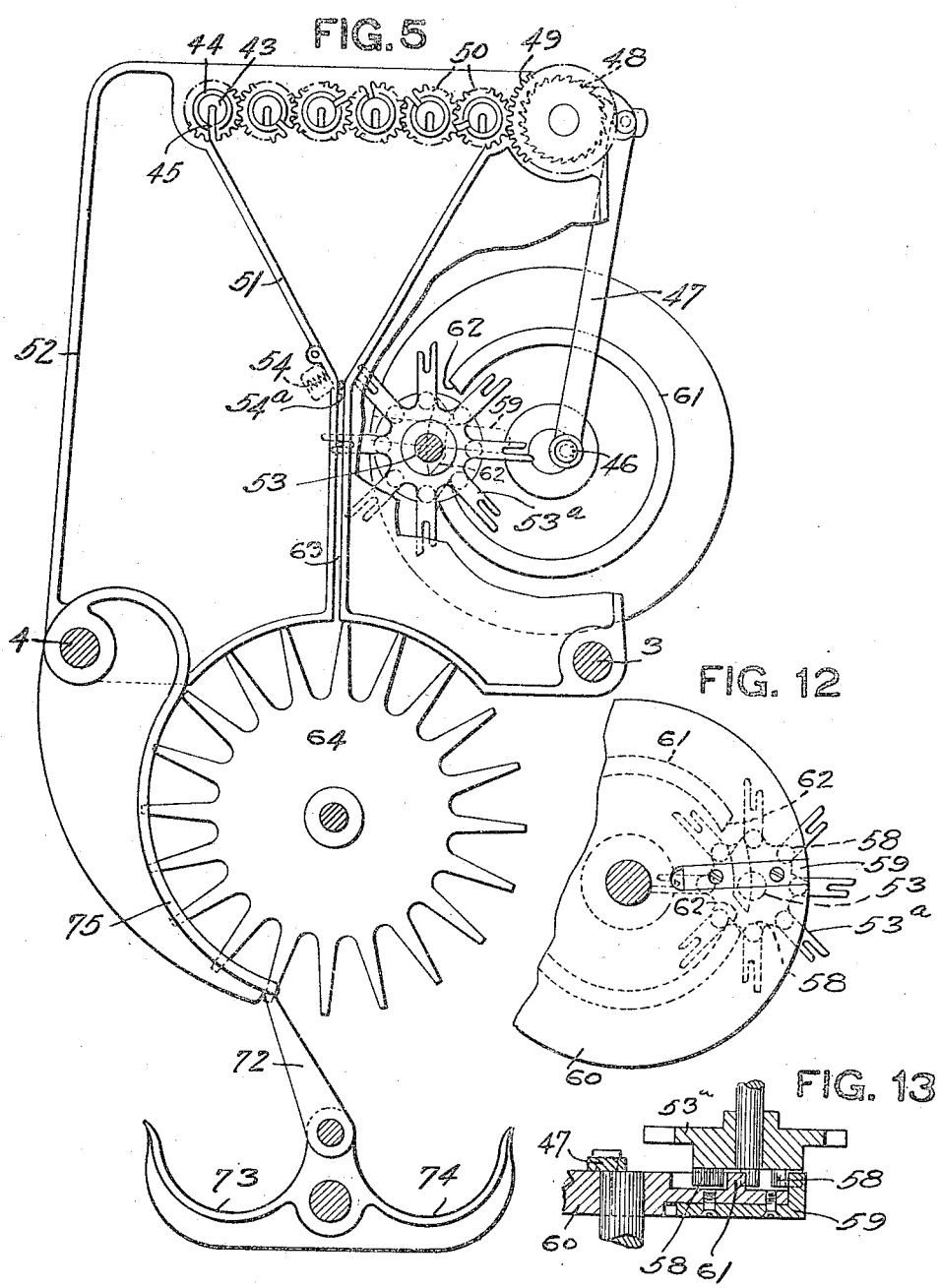

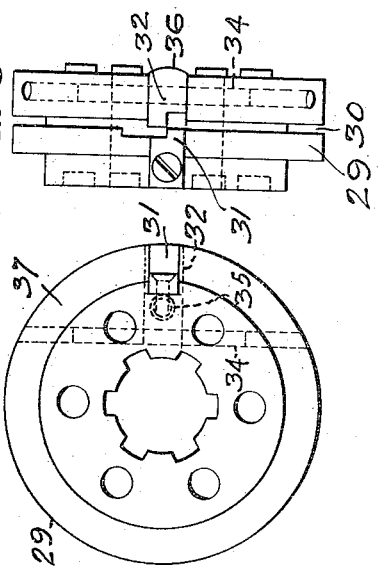
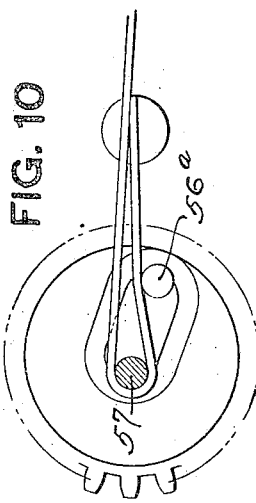
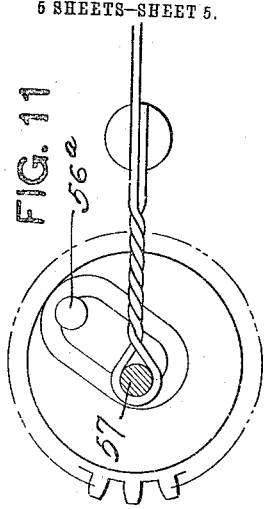
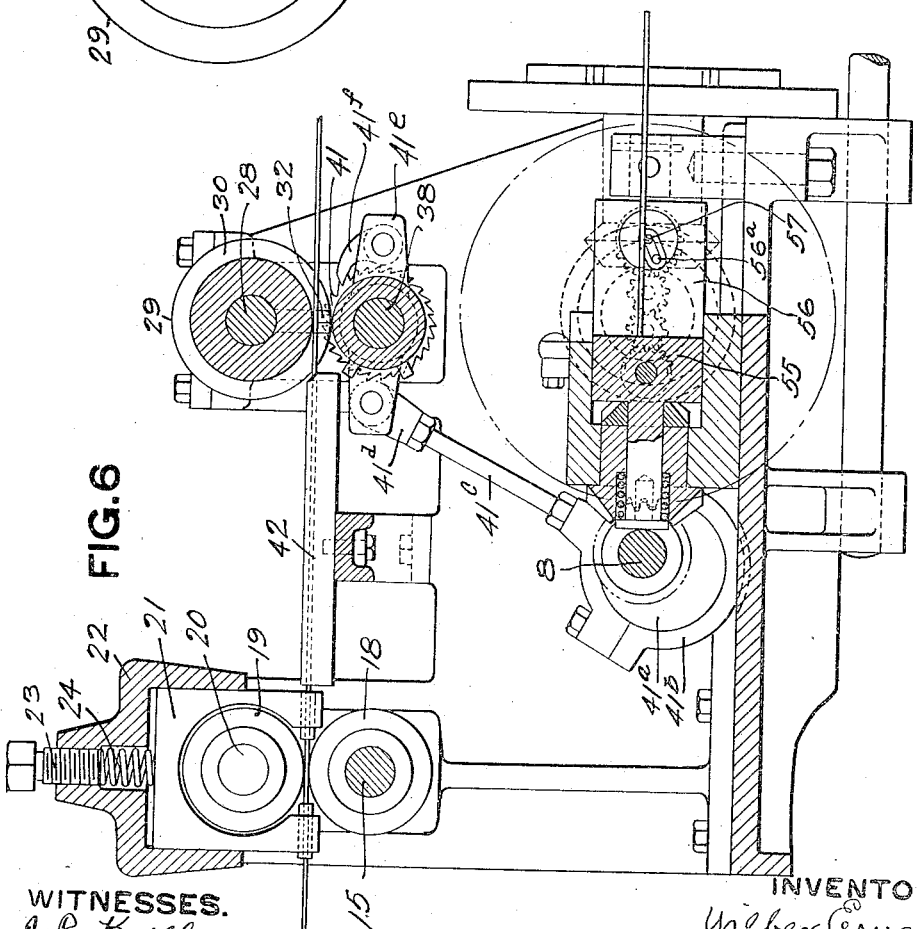

UNITED STATES PATENT OFFICE.

WILBER EMERY, OF WILMINGTON, DELAWARE, ASSIGNOR TO PITTSBURGH STEEL COMPANY, OF PITTSBURGH, PENNSYLVANIA, A CORPORATION OF PENNSYLVANIA.

BALE-TIE MACHINE.

1,125,991.  Specification of Letters Patent.  Patented Jan. 26, 1915.

Application filed March 4, 1912. Serial No. 681,538.

*To all whom it may concern:*

Be it known that I, WILBER EMERY, a citizen of the United States, and resident of Wilmington, in the county of New Castle and State of Delaware, have invented a new and useful Improvement in Bale-Tie Machines; and I do hereby declare the following to be a full, clear, and exact description thereof.

My invention relates to bale-tie machines.

The object of my invention is to provide a machine of this character in which a plurality of strands of wire are fed to the machine and cut in succession and carried to suitable bending and twisting mechanism whereby I provide a machine of large capacity and at the same time one which is simple in construction and not liable to get out of order.

To these ends my invention comprises the novel features hereinafter set forth and claimed.

Figure 1:
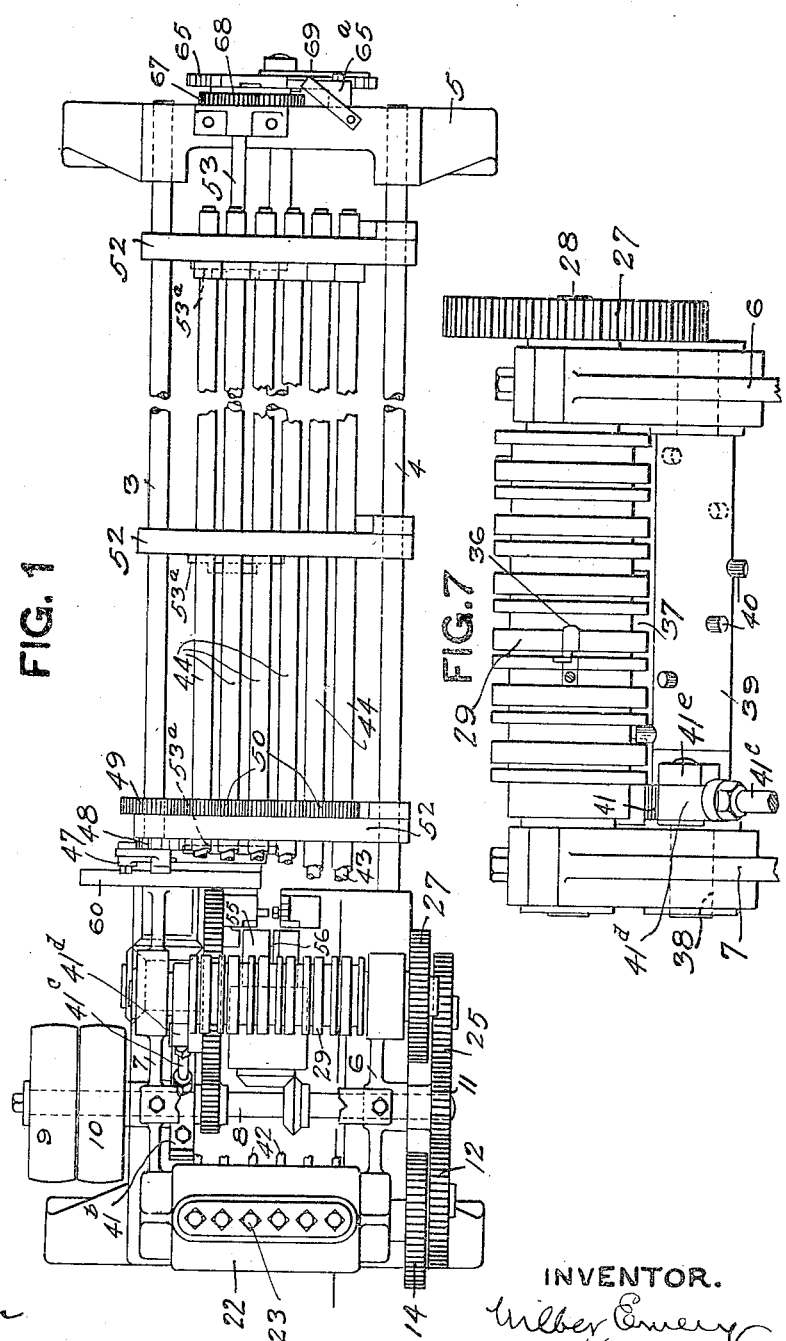
Figure 2:
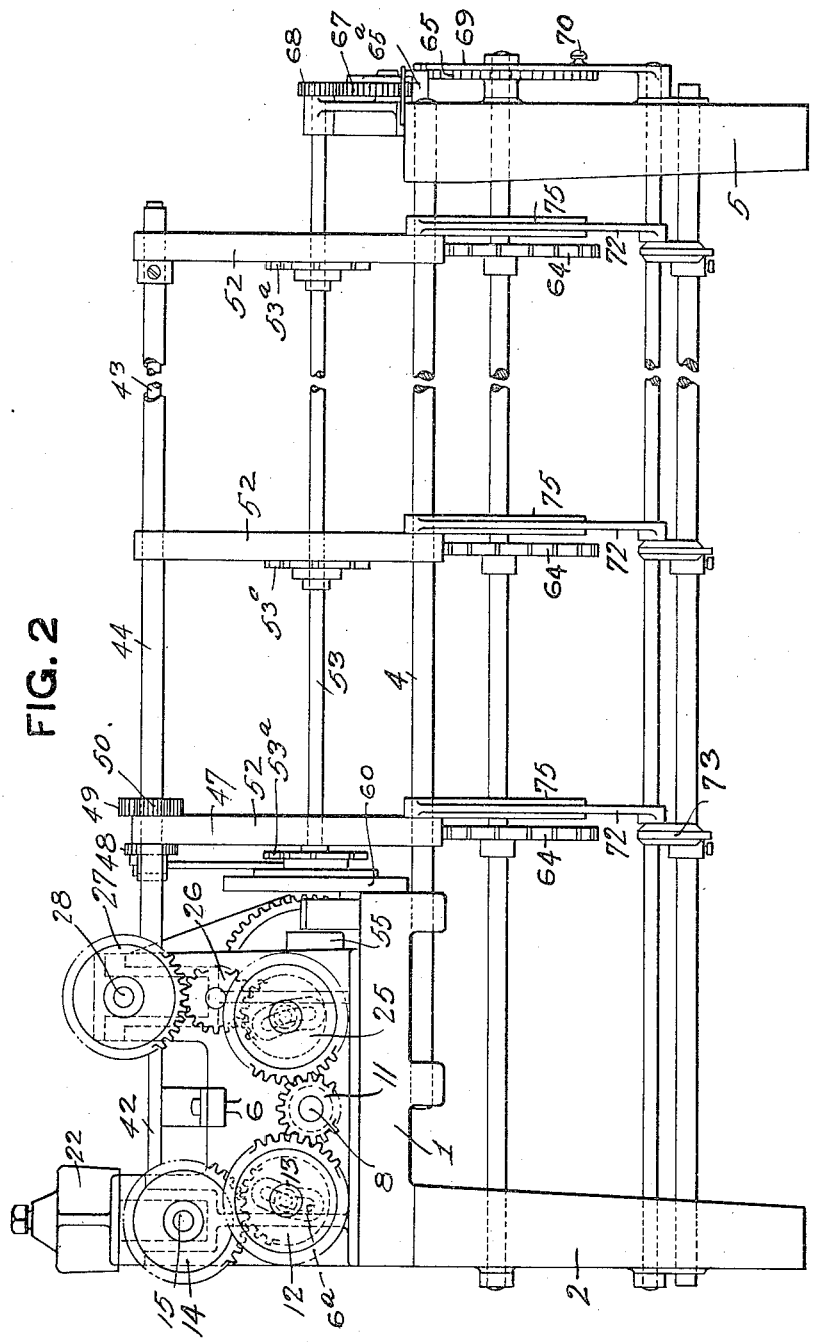
Figure 3:
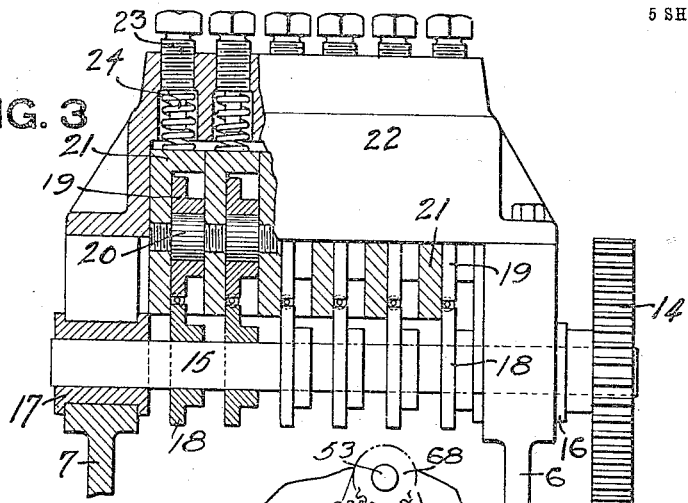
Figure 4:
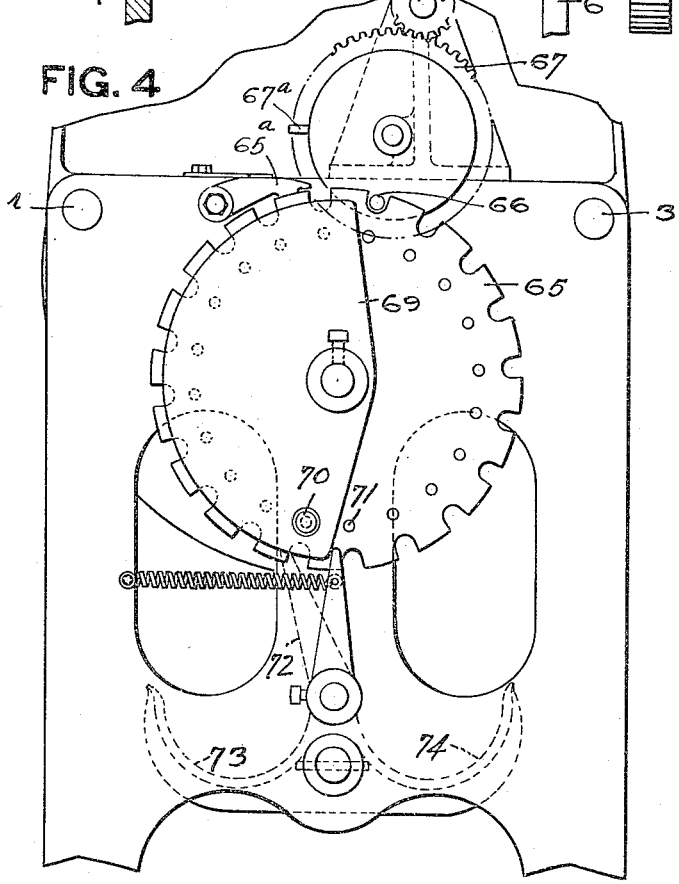

In the accompanying drawings Figure 1 is a general plan view of the machine partly broken away; Fig. 2 is a side elevation; Fig. 3 is a cross section showing the mechanism for feeding the wires forward; Fig. 4 is a detail view of the mechanism for operating the counting devices; Fig. 5 is a section showing the method by which the wire is carried from the temporary receiver to the receiving horn; Fig. 6 is a section showing the feeding, cutting and twisting mechanism; Fig. 7 is a detail face view of the cut-off mechanism; Figs. 8 and 9 are detail views of one of the cutting heads; Figs. 10 and 11 are details of the bending mechanism; Figs. 12 and 13 are details of the mechanism for feeding the cut wires to the bending and twisting mechanism.

In the drawings the numeral 1 denotes the bed supported by front legs 2 and by bars 3 and 4, said bars being fixed in lugs cast on the under side of the bed and in rear legs 5. Supported on the bed in side-brackets 6 and 7 is the main-shaft 8 which receives motion from tight and loose pulleys 9 and 10. On the end of the shaft 8 is located the gear 11 which through intermediate double idler-gear 12 revolving on pin 13 located in segmental slot 6ª in the bracket 6 gives motion to gear-wheel 14 on the end of lower shaft 15 of the feeding mechanism. The shaft 15 revolves in bearings 16 and 17 located in side-brackets 6 and 7, respectively. The shaft 15 carries a series of rollers 18 which co-act on the upper rollers 19 revolving loosely on studs 20 attached to blocks 21. The blocks 21 inclose rolls 19 and slide against each other and between the side walls of cap 22, which is bolted on top of the side brackets 6 and 7. The cap 22 carries set-screws 23 which press downward against springs 24 resting on top of blocks 21, thus pressing rolls 19 firmly against the wires which pass between them and rolls 18. The gear 11 through intermediate double-gear 25 and single idler-gear 26 imparts motion to gear 27 on the end of upper shafts 28 of the cut-off mechanism. This upper-shaft 28 revolves in bearing-blocks located in side-brackets 6 and 7 and carries cutting heads 29 corresponding in number to the pairs of feed-rollers. Slots 30 are cut in the periphery of cutter-heads 29 and their bottom diameters are equal to those of rolls 18 and 19, and said cutter-heads are so geared that they make the same or practically the same number of revolutions as said rolls. Fixed cutters 31 are inserted in the cutter heads 29 and co-acting cutters 32 are pivoted on pins 34, said cutters being held normally apart by springs 35. The cutters 32 have lugs 36 projecting back into grooves 37 formed between the different cutter-heads. Directly below the shaft 28 and cutter-heads 29 is located the shaft 38 which revolves in bearing blocks located in side-brackets 6 and 7 similarly to shaft 28. Shaft 38 carries a drum 39 provided with the pins 40 which are staggered with reference to each other. In the present case owing to the fact that there are six cutter-heads these pins are set so that each one is one-sixth of a revolution behind the preceding one. The pins 40 enter the grooves 37 between cutter-heads and at intervals co-act with lugs 36 on cutters 32, thus forcing cutters 32 into cutting engagement with cutters 31, whereby the wires are sheared in succession. Cutter-heads 29 are adjustable around shaft 28 so that the timing of the cutting-off operation may be changed. An eccentric 41ª is keyed on the main-shaft 8 operating ratchet 41 through eccentric strap 41ᵇ, pitman 41ᶜ, knuckle 41ᵈ, lever 41ᵉ and pawl 41ᶠ. The ratchet 41 is arranged to make one revolution to each complete cycle of the machine, that is, in the case of the present machine, once to every six bale-ties.

The wires by passing between rollers 18 and 19 are fed through guides 42 under cutter-heads 29 through slots 30 in same and into slotted guides 43. These guides are stationary and around them revolve tubes 44, each of said tubes having a longitudinal slot 45. These tubes are made to revolve around the slotted guides 43 by means of crank-pin 46, pitman 47, ratchet 48, driving gear 49 and the train of gears 50. The slots 45 are made to register in succession at equal intervals with the slots in guides 43, so that one wire is dropped at a time into the V-shaped guides 51 of brackets 52. This series of brackets 52 are supported on bars 3 and 4 and serve as supports for the tubes 44 containing the guides 43, and also as a support for a rod 53 carrying a series of finger wheels 53ª which serve to convey the wires from the bottom of the V-shaped guides 51 to the bending and twisting mechanism and from thence drop them into a series of counting wheels which carry them to bundle receiving horns, all as set forth and claimed in an application filed by me of even date herewith, Serial No. 681,587. The springs 54 pressing upon triggers 54ª serve to retain the wires in the bottom of the V-shaped guides 51 until they are removed by the finger wheels. The twisting and bending mechanism has been fully described and illustrated in said application and it is not deemed necessary to illustrate the same in full detail except to say that the twister head 55 is slotted as at 56 and within said slot one end of the wire is supported to be operated on by the bending pin 56ª which bends the wire around the forming pin 57 as indicated in Fig. 10. The twister is then revolved to twist the wire as shown in Fig. 11. One of the finger wheels 53ª carries the pins 58 which are engaged by the arm 59 carried by the disk 60. The disk 60 has the flange 61 which is adapted to pass between the pins and lock the finger wheels so that said finger wheels can only be operated intermittently when the pins again pass through the cut-away portions 62 of said flange 61, all as fully set forth in said application.

The bale-ties when finished drop down through the guide 63 into the counting wheels 64, said counting wheels being intermittently rotated by the toothed wheels 65 through being engaged at intervals by the pin 66 on the gear-wheel 67 which is driven by the pinion 68. The pawl 65ª is adapted to lock the toothed-wheel 65, said pawl being lifted by the pin 67ª on the gear-wheel 67. A cam plate 69 has a pin 70 which is adapted to enter the openings 71 in the toothed disk 65 and said cam-plate is adapted to shift guides 72 so as to discharge contents of half the pockets of the counting wheels 64 into one or other of the horns 73, 74. A guard 75 prevents the bale-ties from dropping from the pockets 64 until the pockets can discharge into the horn. All this counting mechanism and the details of the same are fully set forth in the above-named application.

In the operation of my improved machine the wires are fed into the machine by the feeding rolls 18 and 19 and said wires pass through the guides 42 into the cutter-heads 29 through slots 30 in same and into the slotted guides 43. The cutting mechanism operates successively on the different wires and this is accomplished by the pins 40 engaging successively the grooves 37 between the different cutter-heads, and as said pins 40 enter said grooves they engage the lugs 36 of the cutters 32 and said cutters are forced into cutting engagement with the cutters 31 whereby the wires are cut. In this manner the wires are cut successively and each wire as it is cut drops down into the V-shaped guides 51 so as to be conveyed to the apexes of said guides where it is temporarily held by the triggers 54ª until the finger wheels 53ª come around in position to engage the wire and carry it down into proper position with reference to the twisting and bending mechanism, where it is bent and twisted and is then dropped down through the guides 63 to the counting wheels 64.

While I have described and claimed my invention in connection with a machine for making bale-ties, I do not wish to limit it to such machines, but desire to include all uses to which the invention may be found applicable.

What I claim is:

1. In a bale-tie machine, the combination with a suitable frame, of mechanism for feeding a plurality of wires, means for cutting said wires successively, bending and twisting mechanism, and means for directing the cut wires successively thereto.

2. In a bale-tie machine, the combination with a suitable frame, of mechanism for feeding a plurality of wires, cutters in the path of said wires, means for operating said cutters successively, bending and twisting mechanism, and means for delivering the cut wires successively thereto.

3. In a bale-tie machine, the combination with a suitable frame, of means for feeding a plurality of wires, a plurality of cutting devices, closed supports beyond said cutting devices to receive the wires, means for operating said cutting devices successively, means for releasing said wires successively from said supports, bending and twisting mechanism, and means for delivering the wires thereto.

4. In a bale-tie machine, the combination with a suitable frame, of means for feeding a plurality of wires, a plurality of cutting devices in the path of said wires, means for operating said cutting devices successively, slotted supporting rods beyond said cutting devices to receive the wires, slotted sleeves inclosing said rods, means for turning said sleeves to bring said slots into alinement, bending and twisting mechanism, and means for delivering the wires thereto.

5. In a bale-tie machine, the combination with a suitable frame, of means for feeding a plurality of wires, a plurality of cutting devices comprising fixed and movable cutters, means for operating said movable cutters successively, bending and twisting mechanism, and means for delivering the cut wires successively thereto.

6. In a bale-tie machine, the combination with a suitable frame, of means for feeding a plurality of wires, a plurality of cutting devices comprising rotary slotted heads at intervals apart, fixed and movable cutters, the movable cutters projecting beyond said heads, a rotary member, projections at intervals thereon adapted to engage said movable cutters in succession, bending and twisting mechanism, and means for delivering the wires thereto.

7. In a bale-tie machine, the combination with a suitable frame, of means for feeding a plurality of wires, of rotary cutting devices comprising slotted heads, fixed and movable cutters therein, said heads arranged at intervals with spaces between the same, projections on said movable cutters extending into said spaces, a rotary drum having pins arranged thereon adapted to enter spaces between said cutter-heads to engage said movable cutters, bending and twisting mechanism, and means for delivering the wires thereto.

8. In a bale-tie machine, the combination of a suitable frame, of means for feeding a plurality of wires, means for cutting the wires successively, an inclined guide, bending and twisting mechanism, and means for delivering the cut wires successively thereto.

9. In a bale-tie machine, the combination with a suitable frame, of means for feeding a plurality of wires, of means for cutting the wires successively, a V-shaped guide, bending and twisting mechanism and means for delivering the wires thereto.

10. In a bale-tie machine, the combination with a suitable frame, of means for feeding a plurality of wires, means for cutting the wires successively, a V-shaped guide, a yielding support at the bottom of said guide to temporarily support the wire, bending and twisting mechanism below said guide, and means for delivering the wire thereto.

11. In a bale-tie machine, the combination with a suitable frame, of means for feeding a plurality of wires, means for cutting said wires successively, a V-shaped guide, a spring-actuated support at the bottom of said guide to temporarily support the wire, twisting and bending mechanism below said guide, and means for delivering the wire thereto.

12. In a bale-tie machine, the combination of a shaft, feed rollers carried thereby, a series of blocks having recesses, studs carried by said blocks, feed rollers loosely mounted on said studs in alinement with the first-mentioned feed rollers of said shaft, and a casing inclosing said blocks.

13. In a bale-tie machine, the combination of a shaft, feed rollers carried thereby, a series of blocks having recesses, studs carried by said blocks, feed rollers loosely mounted on said studs in alinement with the first-mentioned feed rollers of said shaft, a casing inclosing said blocks, and springs within said casing engaging said blocks.

14. In a bale-tie machine, the combination of a shaft, feed rollers mounted thereon, a series of blocks having recesses in contact with one another, studs in said recesses, loosely mounted feed-rollers on said studs, a cap inclosing said blocks, and springs within said cap engaging said blocks.

15. In a bale-tie machine, the combination of a shaft, feed-rollers mounted thereon, a series of blocks having recesses, studs in said recesses, loosely mounted yielding feed-rolls on said studs, said blocks having openings therein through which the wire passes.

In testimony whereof, I, the said WILBER EMERY, have hereunto set my hand.

WILBER EMERY.

Witnesses:
HENRY SABROWSKI,
ARTHUR C. GLUCKMAN.